M. L. HUNTER & A. B. CHURCH.
ANNOTATOR FOR COMMERCIAL PHONOGRAPHS.
APPLICATION FILED SEPT. 15, 1915.

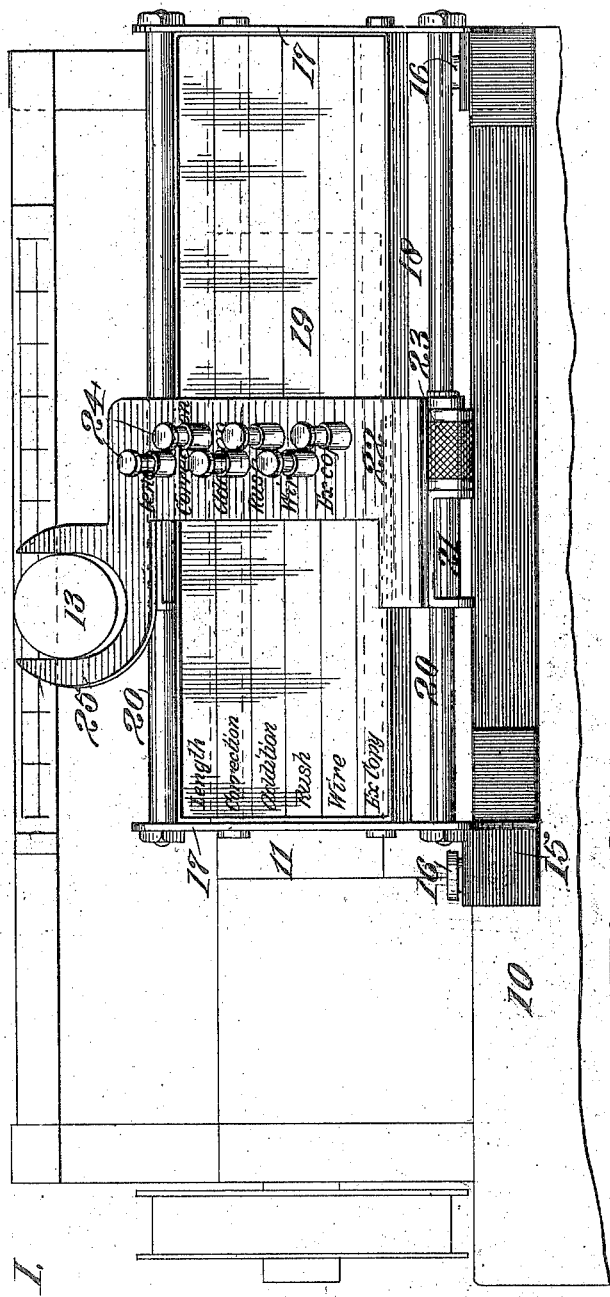

1,216,232.

Patented Feb. 13, 1917.
6 SHEETS—SHEET 2.

WITNESSES:
Charles Pickles
Thos Kastberg

INVENTORS
Martha L. Hunter
Albert B. Church
BY Strong and Townsend,
ATTORNEYS

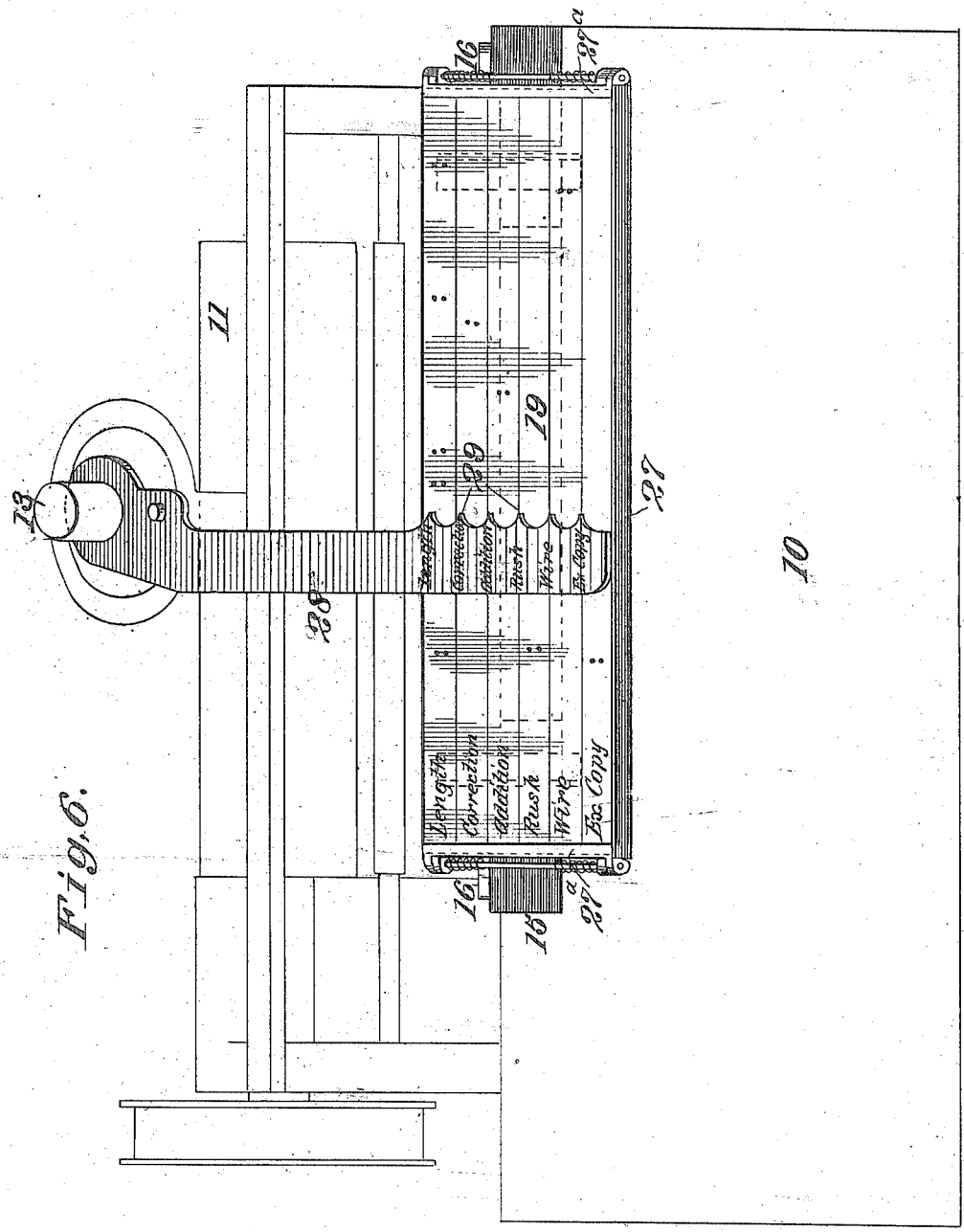

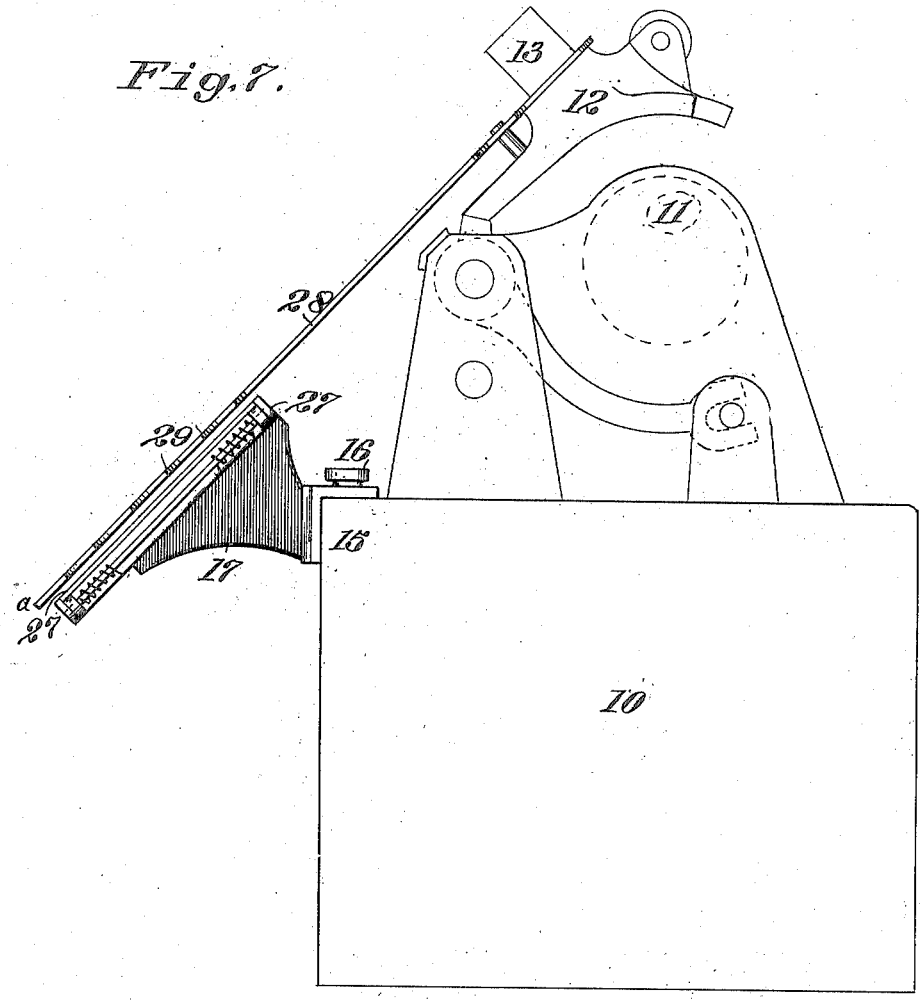

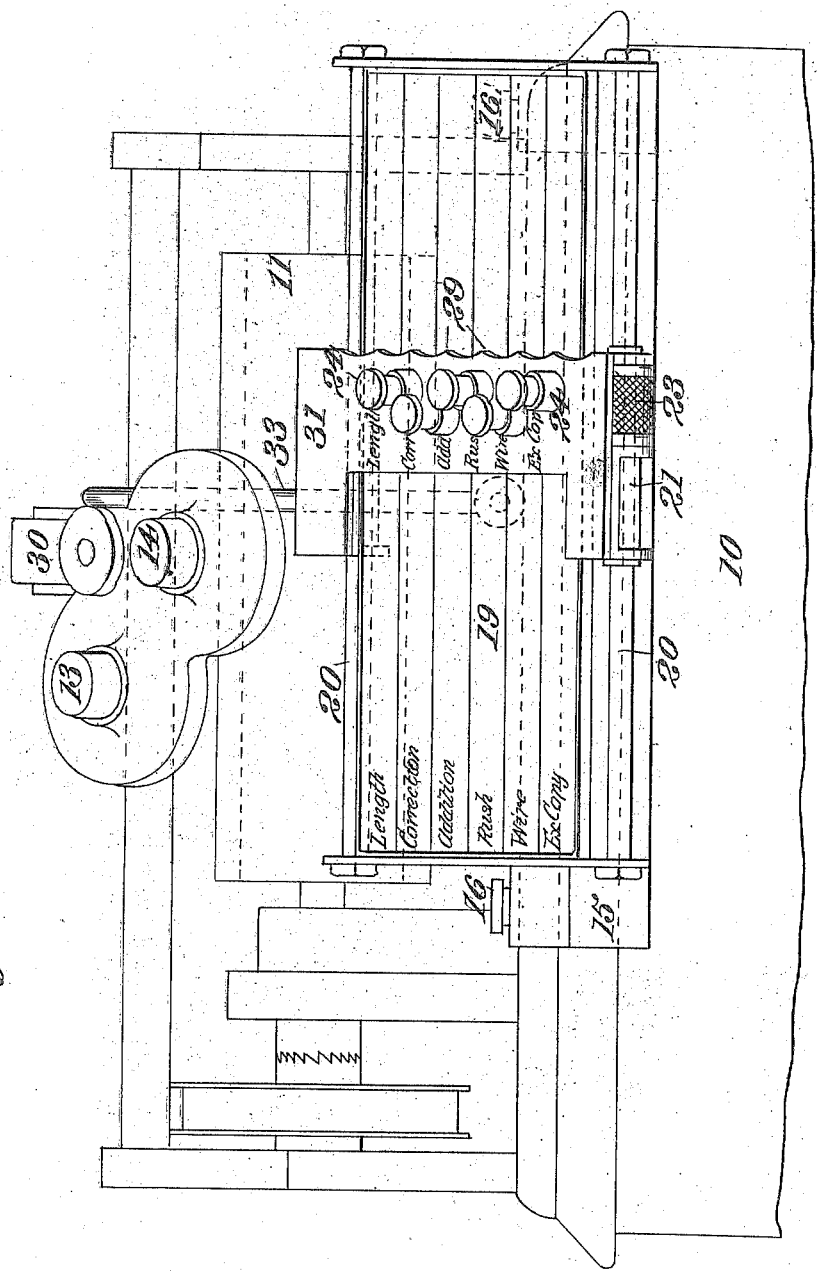

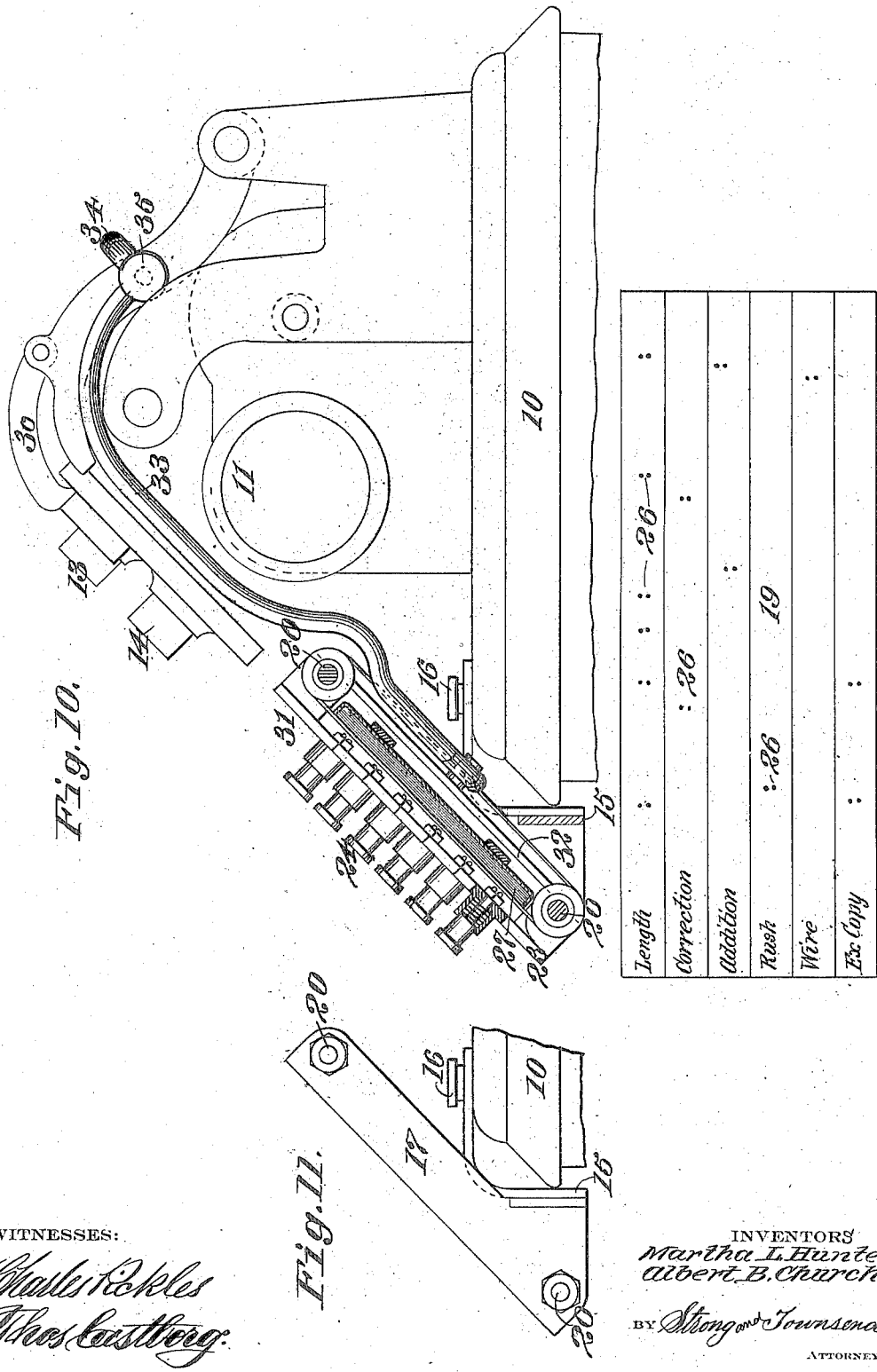

UNITED STATES PATENT OFFICE.

MARTHA L. HUNTER AND ALBERT B. CHURCH, OF SAN FRANCISCO, CALIFORNIA.

ANNOTATOR FOR COMMERCIAL PHONOGRAPHS.

1,216,232. Specification of Letters Patent. Patented Feb. 13, 1917.

Application filed September 15, 1915. Serial No. 50,780.

*To all whom it may concern:*

Be it known that we, MARTHA L. HUNTER and ALBERT B. CHURCH, citizens of the United States, residing in the city and county of San Francisco and State of California, have invented new and useful Improvements in Annotators for Commercial Phonographs, of which the following is a specification.

This invention relates to commercial phonographs.

The object of this invention is to provide, in connection with a commercial phonograph, means movable by the traveling head thereof to traverse a memo sheet and operable by the dictator to mark upon said sheet various instructions applying to the matters contained in the phonograph record, and means whereby, from said memo sheet containing the instructions, the transcriber may locate upon the record the position of the matters to which said instructions apply.

Heretofore it has been proposed to supply a specially printed sheet, properly ruled and provided with stock phrases, said sheet to receive upon its face penciled marks made by the dictator to convey the necessary information relative to the matters in the record for the convenience of the transcriber. Great difficulty has been encountered by users of this memo sheet in properly marking it and also in locating from the marks thereon the position in the phonograph record of the matters to which such marks apply.

In the present invention this objection has been overcome by the provision of mechanical means for carrying on these operations, whereby greater precision and accuracy are obtained.

In carrying out the object of this invention we employ a holder, fastened to the box of the phonograph, to receive sheets of memo paper; a marking device movable with the traveling head of the phonograph to traverse the memo sheet, said marking device embodying keys for printing upon the sheet the necessary instructions; and means also movable with the traveling head of the phonograph to indicate in advance to the transcriber the exact position and location on the phonograph record of the matters to which the marks on the sheet apply.

Two forms which our invention may assume are exemplified in the following description and illustrated in the accompanying drawings, in which—

Figure 1 shows a front elevation of the attachment applied to a dictating machine.

Fig. 2 shows a view of the memo sheet employed.

Fig. 6 shows a front elevation of the transcribing attachment applied to a phonograph.

Fig. 7 shows a side elevation of the device illustrated in Fig. 6.

Fig. 8 shows a front elevation of a combined dictating and transcribing attachment applied to a phonograph embodying both the dictating and transcribing elements.

Fig. 9 shows a detail view of the connection employed in the device illustrated in Fig. 8 between the traveling head and indicator device.

Fig. 10 shows a side elevation of the device illustrated in Fig. 8.

Fig. 11 shows a detail view, illustrating the method of detachably connecting the holder to a phonograph box.

Figure 3:
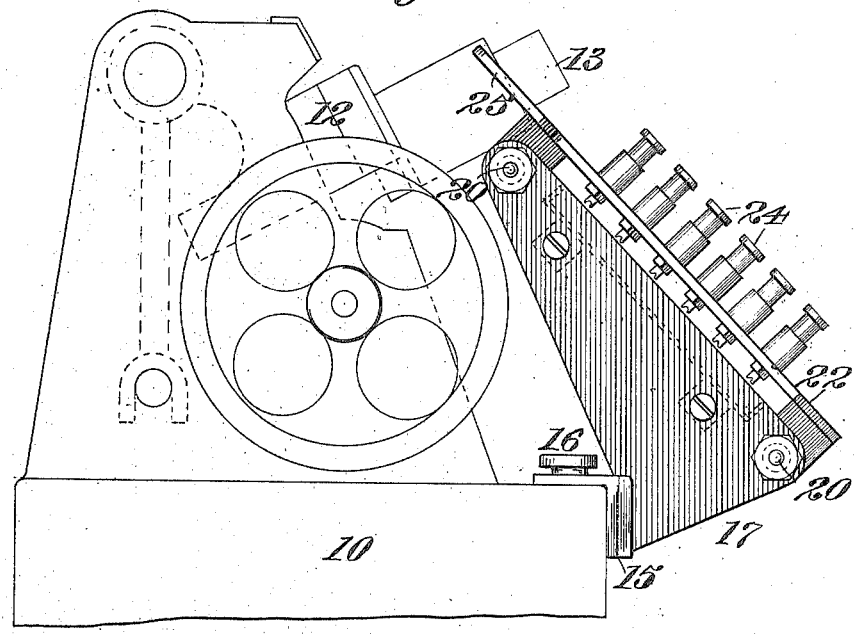
Fig. 3 shows a side elevation of the device illustrated in Fig. 1.
Figure 4:
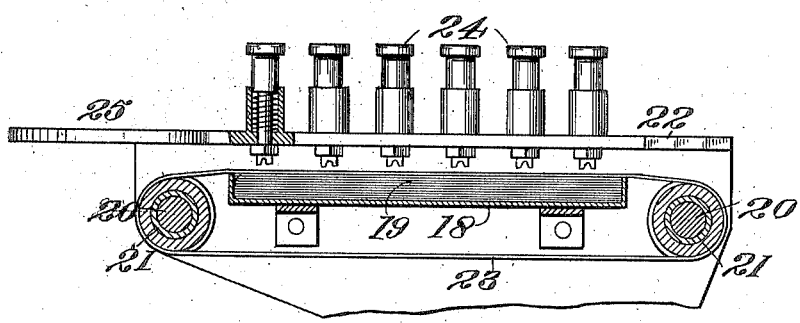
Fig. 4 shows a cross sectional view of the holder and marking device employed in connection with a dictating machine.
Figure 5:
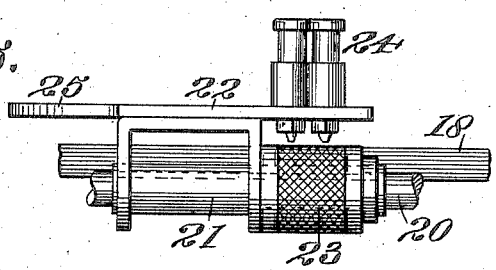
Fig. 5 shows a detail view of the sliding connection between the marking device and the holder, illustrating also the inking ribbon and marking keys in end elevation.

In the drawings, a phonograph is shown comprising a box 10, a cylindrical record 11, and a movable head 12. The latter in one case (Figs. 1 and 3) is provided with a recorder 13 and in the other case (Figs. 6 and 7) with a reproducer 14. Attached to the front side of the box, by suitable brackets 15 and thumb-screws 16, is a holder 17 (see Figs. 1 and 3) to receive a tray 18 designed to contain a pad of memo sheets 19, one of which is shown in Fig. 2. A pair of rods 20 extend across the holder and upon them is slidably mounted, by means of bearings 21, a marking device 22, carrying at its under side an endless ribbon 23 running over said bearings 21 and encircling the tray, said ribbon being designed to contain ink. Included in the marking device is a series of spring-pressed keys 24, spaced apart in a vertical direction and positioned to contact with the upper run of the ribbon, when depressed, to thereby mark upon the exposed sheet of paper in the tray.

A bifurcated head 25, on the marking device, embraces the recording attachment 13 of the phonograph, and thus as the phonograph is operated the marking device is moved across the holder simultaneously with the movement of the recording device, traversing in this way the entire length of the memo sheet 19. The form of connection between the marking device and the recording attachment permits raising and lowering of the latter without interference.

Each key 24 is labeled with some such stock phrase as "length", "correction", "addition", etc., and the memo sheet 19 may be ruled and printed accordingly, or may be merely a blank slip of paper. Depressing a key 24 will imprint upon the sheet 19 a mark, such as shown at 26, on said sheet which will indicate to the transcriber in advance some special instruction concerning the dictation. For instance, the "correction" key indicates any change made in the dictation; the "rush" key indicates special dictation which it is desired to be transcribed in advance of the others; the "wire" key immediately locates any telegrams so that they may be transcribed without delay. The remaining keys are believed to be self-explanatory.

The sheet 19 thus marked is a panorama of the contents of the phonograph record. It readily indicates whether a letter should be single or double spaced by reason of the length of the communication; the location of letters and telegrams which should be transcribed first; letters of which extra copies are required, thereby obviating double work in rewriting; additions, which otherwise would require the time for replacing the letter in the typewriter; and especial corrections which are annoying, necessitating erasures, spoiling the sheet, or actually rewriting the letter and the loss of the time and stationery.

When the phonograph record is completed, the operator removes the same and inserts the sheet of memo paper corresponding thereto within the cylinder, and when transferring the record to the transcribing machine, the memo sheet is introduced in a holder 27 (see Figs. 6 and 7), detachably connected to the box 10 in a manner similar to the holder 17 and corresponding in position thereto. The holder 27 comprises a base plate, on the ends of which are spring-pressed clips 27ª for retaining the sheet in a flattened position thereon. Rigidly connected to the reproducing device 14 of the transcribing machine is an indicator plate 28 positioned to travel across the holder and provided with indicating notches 29 labeled to correspond with the keys of the marking device. Thus the operator is enabled to locate the position of the various matters in the record to which the marks on the memo sheet apply merely by sliding the reproducing device, to which the indicator plate is attached upon the record, until the notches on said plate register with the various marks on the paper. Now, these marks, while here shown in the form of dots, may be of any nature or may be the printed word itself.

In Figs. 8 and 10 is shown a different form of dictating machine, in which the recorder 13 and reproducer 14 are embodied in a single head 30. For the purpose of attaching our device to this machine, a special plate 31 is employed embodying both keys 24 and notches 29. A connecting plate 32 extends from bearing to bearing beneath the plate 31, and rigidly connected thereto is an arm 33 extending up over the cylinder and detachably connected, by a clip 34 and thumb screw 35, to the arm of the traveling head 30. The recorder and reproducer being pivoted to the head 30 are free to be swung into position when a connection of this form is used. In this modification the operation is the same as in the other, but the construction is simpler in that two devices are combined in one.

Other modifications may be employed without departing from the spirit of our invention as disclosed in the appended claims.

Having thus described our invention, what we claim and desire to secure by Letters Patent is—

1. The combination with a commercial phonograph having a rotatable element and a traveling element, of a memo sheet holder, mechanical means for marking instructions upon a sheet within said holder when dictating, regarding the matters contained in the phonograph record, and a yoke embracing a projection on the traveling element and connected rigidly with the marking means for moving the latter across the sheet in said holder.

2. The combination with a commercial phonograph, having a rotatable element and a traveling element, of a memo sheet holder, and a marking device movable with the traveling element of the phonograph and traversing the sheet in the holder, whereby the dictator may mark upon said sheet a variety of instructions pertaining to the phonograph record, said marking device comprising an upwardly and forwardly inclined plate at the front of the phonograph and a series of depressible printing keys thereon arranged in staggered relation for compactness.

3. In combination with a commercial phonograph having a rotatable element and a traveling element, a holder detachably connected to the box thereof, a tray removably received in said holder and adapted to receive a pad of memo sheets, and a marking device comprising a plate and a series of printing keys thereon, said plate being connected with the traveling element of said phonograph and slidably mounted on said holder to move across said sheets, whereby the operator may imprint upon the exposed sheet various instructions applying to the matters contained in the record of said phonograph.

4. In combination with a commercial phonograph having a rotatable element and a traveling element, a holder detachably connected to the box thereof and adapted to receive a memo sheet, rods extending across said holder, and a marking device slidable on said rods and connected to the traveling element of the phonograph, said marking device being provided with means whereby the operator may imprint upon the sheet various instructions applying to the matters contained in the phonograph record.

5. In combination with a commercial phonograph having a rotatable element and a traveling element, a holder attached thereto, a tray in said holder adapted to receive a memo sheet, rods extending across said holder, a plate slidable on said rods, sleeve connections between said plate and rods, a connection between said plate and the traveling element, a series of depressible marking keys on said plate, whereby the operator may imprint various instructions on the sheet applying to the matters contained in the phonograph record, and an endless inking ribbon running over said sleeves and encompassing said tray to coact with the marking keys.

6. The combination with a commercial phonograph having a rotatable element and a traveling element, of a holder detachably connected thereto and adapted to receive a memo sheet, a plate slidably mounted on said holder and having a connection with the traveling element to move across said holder, said plate having a series of printing keys to mark upon the sheet and a series of pointers on its front edge to correspond with the positions of said keys.

In testimony whereof we have hereunto set our hands in the presence of two subscribing witnesses.

MARTHA L. HUNTER.
ALBERT B. CHURCH.

Witnesses:
JOHN H. HERRING,
W. W. HEALEY.